Nov. 25, 1924.
E. E. SMITH
1,517,028
FLYTRAP
Filed July 10, 1922
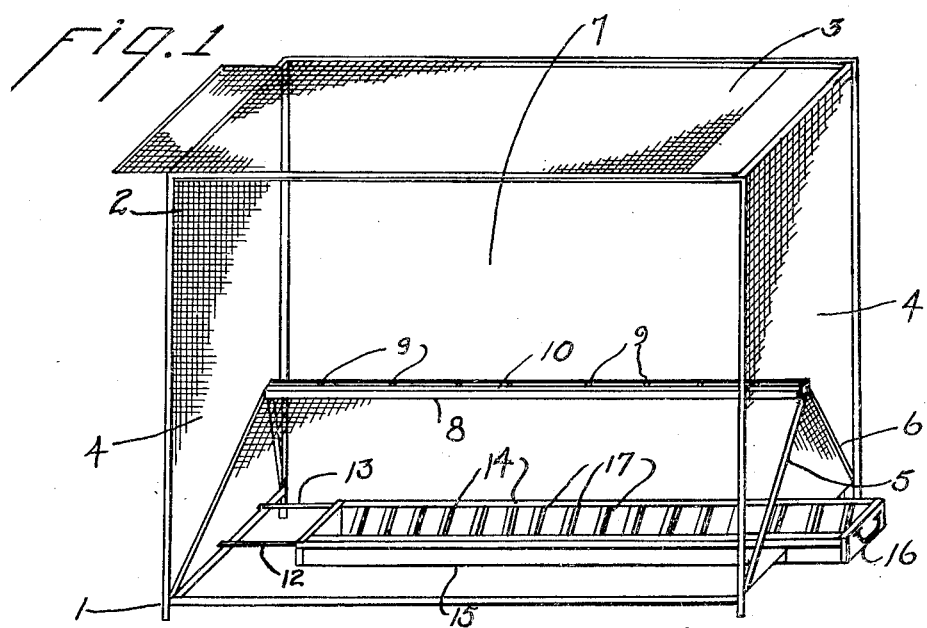
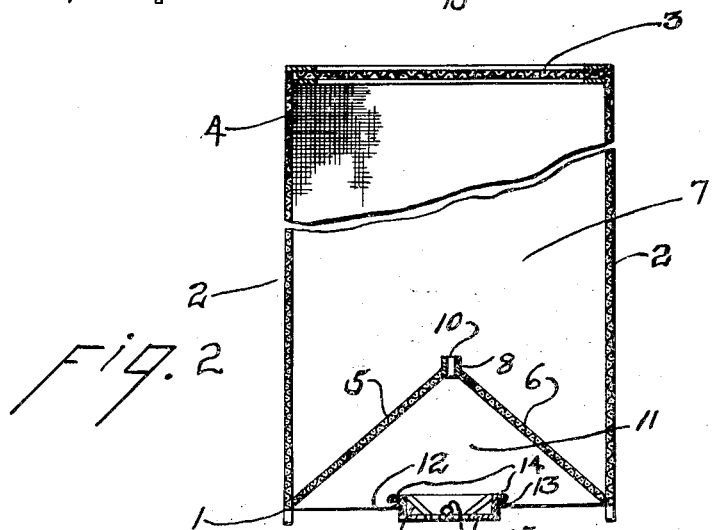
Erasmus E Smith, Inventor
By Geo E Kirk
Attorney Patented Nov. 25, 1924.

1,517,028

UNITED STATES PATENT OFFICE.

ERASMUS E. SMITH, OF BRYAN, OHIO.

FLYTRAP.

Application filed July 10, 1922. Serial No. 573,854.

*To all whom it may concern:*

Be it known that I, ERASMUS E. SMITH, a citizen of the United States of America, residing at Bryan, Williams County, Ohio, have invented new and useful Flytraps, of which the following is a specification.

This invention relates to insect entrapping devices.

This invention has utility when incorporated in wire-cloth fly traps.

Referring to the drawings:

Fig. 1 is a perspective view of an embodiment of the invention in a rectangular chamber wire cloth fly trap, the tray for bait being partially removed; and Fig 2 is a transverse section of the trap of Fig. 1.

Frame 1 of right hexahedral skeleton form serves as a mounting for parallel wire cloth sides 2 connected by wire cloth top 3, the ends being closed by perforate or wire cloth walls 4. The two sides 2 and the two ends 4, extend to provide a slight clearance as to the bottom support upon which the frame 1 is carried.

Inwardly extending and upwardly converging in inverted V-shaped arrangement are perforate or wire cloth bottom wall portions 5, 6, completing perforate wall insect receiving chamber 7. The point or upper portion of the V-shaped bottom 5, 6, for the receiving chamber 7 terminates in a long narrow extension 8 the opposing side walls of which are stiffened by cross pieces 9. This provides a long narrow entrance way or slot 10, for flies rising in the lower region or sub-chamber 11, so that they may readily move into the main receiving chamber 7 of the trap. By disposing the entrance 10 in the manner herein disclosed, the flies reaching the chamber 7 are unable to locate their way of entrance. The accumulated flies as trapped in the chamber 7 may be killed, say by drowning or otherwise, and removed by opening the chamber 7, as the top side 3 has a slip fit in assembling with the frame 1.

Enticing means for the insects which it is desired to entrap, may be provided, say in the region of the sub-chamber 11. To this end parallel wires or rods 12, 13, between the ends 4, may be engaged by hooks 14 or flanged over side portions of drawer or tray 15, which may be withdrawn from position in the bottom portion of the subchamber 11, by pulling upon drawer pull 16. As so withdrawn, the drawer or tray 15 is exposed for cleaning or depositing a new supply of bait, as sweets, thereinto. Inclines 17 from the drawer sides to the region of sweets or bait 18 in the bottom of the drawer or tray 15, contribute to the ease for insect movement to the location below the entrance 10 to the main trap chamber 7. As the flies feed on the bait and rise therefrom, they are not only quite isolated from the place of creeping entrance under the side and end walls 2, 4, but may readily ascend through the slot 10 and thereby be imprisoned even against return to the bait.

The general frame structure is such as may be readily and simply formed, and the screen or wire cloth assembled therewith in a substantial manner. There is extended capacity for fly entrance, with simple structure for baiting, and sanitary upkeep.

What is claimed and it is desired to secure by Letters Patent is:

1. A fly trap embodying a gable bottomed fly receiving chamber, a frame for mounting said chamber and including cross bars at the gable ends, a pair of parallel wires between said bars, and a bait tray slidable into said gable along said wires.

2. An insect imprisoning receiving chamber, there being a narrowing entrance thereto, and a removable channel tray below the entrance provided with ways inclined downwardly into said tray, said tray serving as a bait repository.

3. An insect imprisoning receiving chamber, there being a slot entrance thereto from below, guides extending longitudinally of the entrance and a removable bait drawer below the entrance sustained by and movable along said guides.

In witness whereof I affix my signature.

ERASMUS E. SMITH.